G. L. KNIGHTS.
SAW TABLE GUIDE.
APPLICATION FILED MAR. 3, 1911.
1,048,319.
Patented Dec. 24, 1912.
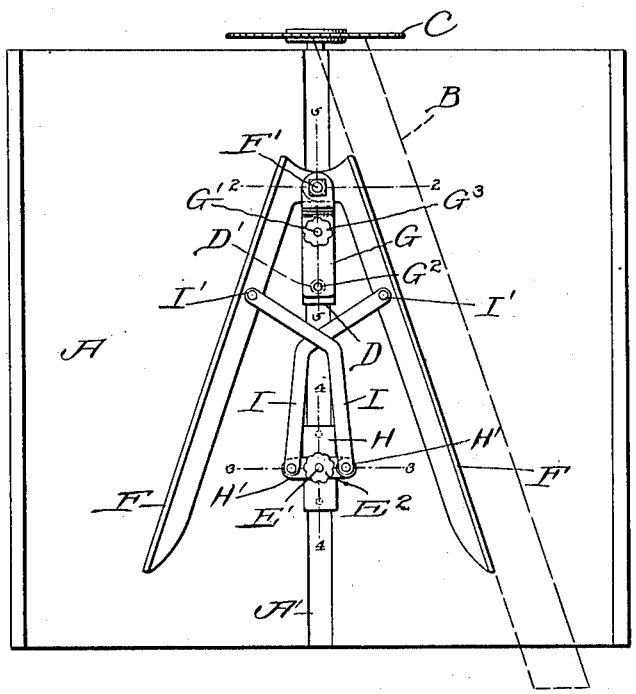
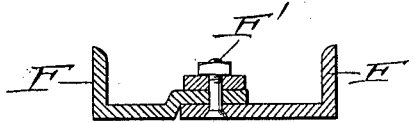
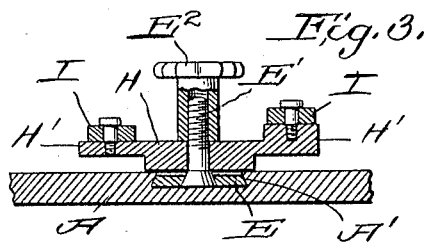
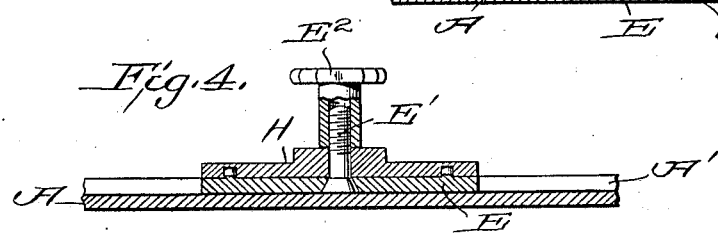
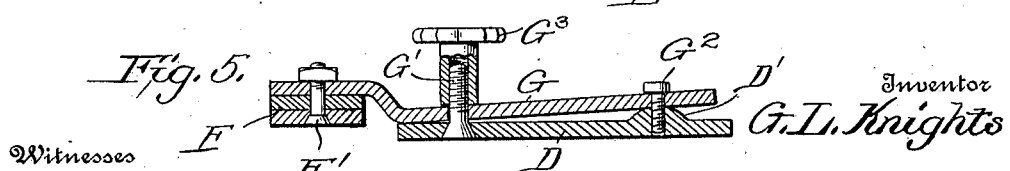

UNITED STATES PATENT OFFICE.

GEORGE L. KNIGHTS, OF AMESBURY, MASSACHUSETTS, ASSIGNOR TO PETTINGELL MACHINE CO., OF AMESBURY, MASSACHUSETTS, A CORPORATION OF MASSACHUSETTS.

SAW-TABLE GUIDE.

1,048,319. Specification of Letters Patent. Patented Dec. 24, 1912.

Application filed March 3, 1911. Serial No. 612,008.

*To all whom it may concern:*

Be it known that I, GEORGE L. KNIGHTS, a citizen of the United States, residing at Amesbury, in the county of Essex and State of Massachusetts, have invented a new and useful Improvement in Saw-Table Guides, of which the following is a specification.

This invention is a novel construction of saw table guide, the object being to provide a guide capable of arrangement upon a saw table and whereby the work holder can be easily and quickly arranged at the proper angle.

Heretofore saw tables have been provided with guides at either side or end and when it was desired to cut material upon the bias or incline, the gage at one end was adjusted and when the reverse bevel or incline was to be cut, the gage at the opposite end was adjusted and consequently considerable time and labor were required in order to get these adjustments accurate as each one necessarily had to be made separate or independent of the other.

The object of the present invention is to provide a guide of such construction that the adjustment for one cut simultaneously produces the adjustment for the reverse cut thereby saving greatly in both time and labor and insuring absolutely accurate cuts in reverse directions.

With these various objects in view, my invention consists broadly in the employment of a pair of gage arms pivotally connected together at one end, and a pair of oppositely disposed spreader arms connected to the gage arms intermediate their ends, said gage arms and spreader arms being pivotally connected to blocks or plates adapted to travel in a guideway produced in the table.

The invention consists also in certain details of construction whereby the various operations are accomplished, all of which will be fully described hereinafter and pointed out in the claims.

In the drawings forming a part of this specification, Figure 1 is a top plan view of a saw table provided with my improved construction of gage. Fig. 2 is a sectional view on the line 2—2 of Fig. 1. Fig. 3 is a sectional view on the line 3—3 of Fig. 1. Fig. 4 is a sectional view on the line 4—4 of Fig. 1. Fig. 5 is a sectional view on the line 5—5 of Fig. 1.

Referring to the drawings, A indicates a reciprocating saw table of the usual construction which carries the material B to be cut by the saw C. A dove-tail groove A' is cut in the upper face of this saw table and working in said groove are the dove-tail blocks or plates D and E. The plate D has a slight rise or boss D' adjacent to its rear end.

F—F indicate the angled gage arms, said arms being so shaped as to lie flat upon the table A and present vertical faces for the work B to rest against. These arms F—F are formed with overlapping lugs at their forward end through which a pivot bolt F' passes, said bolt also passing through the forward end of a plate G which is carried by the block D by means of the screws G', $G^2$ and the hand nut $G^3$, the nut $G^3$ being loosened whenever it is desired to shift the position of the block D, it being understood that this block is locked within the dove-tail groove by tightening the hand nut, which draws the dove-tail block tightly up into the groove. The block E is locked in a similar manner by means of the bolt or screw E' and the hand nut $E^2$. The plate E has a casting H secured thereon by the bolt E', said casting having laterally projecting lugs H' to which are pivotally connected the spreader arms I, said spreader arms being angular in shape and crossing each other as shown and connected at their forward ends to the opposite gage arms as shown at I' and it will be understood that when the forward end of the gage is locked the arms can be opened or closed by moving the block E toward or away from the block D and the position of the forward end of the gage can be shifted or changed at any time thereby loosening the hand nuts $E^2$ and $G^3$ or by simply loosening the hand nut $G^3$. It is obvious that the blocks D and E being arranged in line and the spreader arms connected at oppositely disposed points, the adjustment of one gage arm necessarily produces the opposite adjustment in the other arm and consequently when a certain adjustment is produced for cutting one incline or bevel the opposite incline or bevel is simultaneously gaged.

This invention is particularly adapted for cutting the inclines or bevels in making frames and similar articles.

It will of course be understood that the gage arms can be adjusted so as to occupy parallel positions so that the stock can be cut straight instead of obliquely.

Having thus fully described my invention what I claim as new and desire to secure by Letters Patent, is:

1. The combination with a movable table, having a groove, of blocks movable in said groove, gage arms pivoted to one block and spreader arms pivoted to the other block and also to the gage arms and means for locking said blocks in the groove, as set forth.

2. The combination with a movable table having a groove, of blocks arranged in said groove and movable independently of each other and also in unison, gage arms pivoted to one block, spreader arms connected to the other block and to the gage arms said spreader arms crossing each other and means for locking said blocks in the groove.

3. The combination with a movable table having a groove, of a block movable in said groove, a plate attached to said block, gage arms pivotally connected to said plate, means for binding said plate and block together, a second block having a casting connected thereto, spreader arms pivotally connected to said casting and also to said gage arms and means for connecting said second block and casting together, as set forth.

GEORGE L. KNIGHTS.

Witnesses:
WILBUR H. TAYLOR,
MABEL F. WHITE.

---

Copies of this patent may be obtained for five cents each, by addressing the "Commissioner of Patents, Washington, D. C."